United States Patent
Wu (10) Patent No.: US 8,085,753 B2
(45) Date of Patent: Dec. 27, 2011

(54) METHOD AND RELATE APPARATUS FOR ENHANCING TRANSMISSION EFFICIENCY IN A TRANSMITTER OF A WIRELESS COMMUNICATION SYSTEM

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 890 days.

(21) Appl. No.: 12/123,474

(22) Filed: May 20, 2008

(65) Prior Publication Data

US 2009/0290569 A1    Nov. 26, 2009

(51) Int. Cl.
*H04J 3/24* (2006.01)
*H04J 3/26* (2006.01)

(52) U.S. Cl. ............... 370/349; 370/469; 370/474

(58) Field of Classification Search .......... 370/310–350, 370/208–210, 466, 469, 474
See application file for complete search history.

(56) References Cited

U.S. PATENT DOCUMENTS

| | | | | |
|---|---|---|---|---|
| 7,447,504 B2* | 11/2008 | Lohr et al. | ............... | 455/450 |
| 7,649,907 B2* | 1/2010 | Jung et al. | ............... | 370/466 |
| 7,675,942 B2* | 3/2010 | Lee et al. | ............... | 370/474 |
| 7,929,570 B2* | 4/2011 | Lee et al. | ............... | 370/474 |
| 7,949,012 B2* | 5/2011 | Chang et al. | ............... | 370/474 |
| 2005/0213605 A1* | 9/2005 | Kim et al. | ............... | 370/466 |
| 2008/0267135 A1* | 10/2008 | Legg | ............... | 370/335 |
| 2009/0022077 A1* | 1/2009 | Lin et al. | ............... | 370/310 |
| 2009/0036061 A1* | 2/2009 | Chun et al. | ............... | 455/68 |

FOREIGN PATENT DOCUMENTS

| WO | 2007091839 A1 | 8/2007 |
|---|---|---|
| WO | 2008047309 A | 4/2008 |

OTHER PUBLICATIONS

3GPP TS 25.321 V7.5.0 (Jun. 2007) Technical Specification Group Radio Access Network; Medium Access Control (MAC) protocol specification (Release 7).
3GPP TS 25.322 V7.3.0 (Jun. 2007) Technical Specification Group Radio Access Network; Radio Link Control (RLC) protocol specification (Release 7).

* cited by examiner

*Primary Examiner* — Tri H Phan
(74) *Attorney, Agent, or Firm* — Winston Hsu; Scott Margo (57) ABSTRACT

A method for enhancing transmission efficiency in a transmitter of a wireless communication system includes forming a first RLC PDU and a second RLC PDU with a size equal to a size of the first RLC PDU in an RLC layer, submitting the first RLC PDU and the second RLC PDU to a MAC layer via a logic channel, combining the first RLC PDU with the second RLC PDU into a MAC PDU, forming a header including a plurality of fields indicating parameters of the first RLC PDU and a specified field indicating parameters of the second RLC PDU in the MAC PDU, and transmitting the MAC PDU to a peer receiver.

12 Claims, 7 Drawing Sheets

METHOD AND RELATE APPARATUS FOR ENHANCING TRANSMISSION EFFICIENCY IN A TRANSMITTER OF A WIRELESS COMMUNICATION SYSTEM

BACKGROUND OF THE INVENTION

1. Field of the Invention

The present invention relates to a method and related apparatus for enhancing transmission efficiency in a wireless communication system, and more particularly, to a method and related apparatus for reducing overhead of MAC-ehs header, so as to reduce system overhead.

2. Description of the Prior Art

The third generation (3G) mobile telecommunication system has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of QoS requirements simultaneously, providing diverse, flexible, two-way transmission services and better communication quality to reduce transmission interruption rates.

The access stratum of the 3G mobile telecommunication system comprises a radio resource control (RRC), radio link control (RLC), media access control (MAC), packet data convergence protocol (PDCP), broadcast/multicast control (BMC) and other sub-layers of different functions. The operations of the above-mentioned sub-layers are well known for those skilled in the art, and will not be further mentioned. A primary function of the RLC layer is providing different transmission quality processing, performing segmentation, reassembly, concatenation, padding, retransmission, sequence check, and duplication detection on received data or control instructions based on different transmission quality requirements. The MAC layer can match packets received from different logic channels of the RLC layer to common, shared, or dedicated transport channels according to radio resource allocation commands of the RRC layer, for performing channel mapping, multiplexing, transport format selection, or random access control.

In the RLC layer, the purpose of "padding" is to make lengths of all Protocol Data Units (PDUs) outputted from an RLC entity to be the same. That is, after the RLC entity receives a Service Data Unit (SDU) from the upper layer, if the length of the SDU is smaller than a maximum PDU payload size, the RLC entity will pad out the SDU with meaningless data, so as to form a PDU in conformation with a predefined length. Otherwise, if the length of the SDU is greater than the maximum PDU payload size, the RLC entity will segment the SDU with the maximum PDU payload size. After the segmentation, if the length of the last segment is smaller than the maximum PDU payload size, the RLC entity will pad out the last segment with meaningless data, to form a PDU in conformation with the predefined length.

In the prior art, "padding" can make the lengths of the RLC PDUs to be identical to each other. However, the prior art "padding" decreases bandwidth utility rate and data processing efficiency, especially for high data rate applications, such as High Speed Downlink Package Access (HSDPA) and High Speed Uplink Package Access (HSUPA) in the 3G mobile telecommunication system. In such a situation, a scheme of flexible RLC PDU size is proposed to eliminate padding, to enhance bandwidth utility rate and data processing efficiency, and to improve uplink and downlink (UL/DL) transmission rate.

Figure 1:
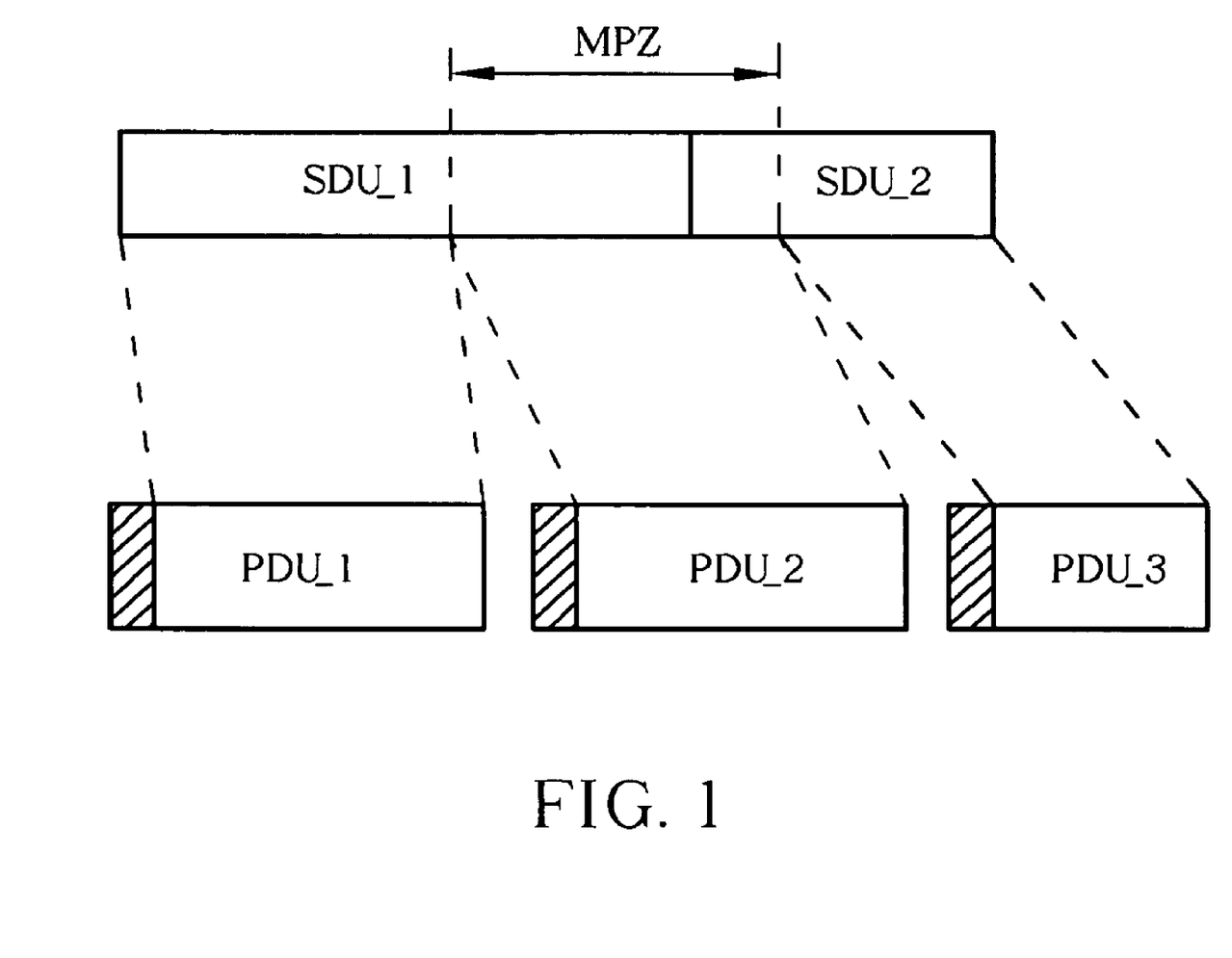
FIG. 1 illustrates a schematic diagram of an application of the flexible RLC PDU size according to the prior art.

For example, please refer to FIG. 1, which illustrates a schematic diagram of an application of the flexible RLC PDU size according to the prior art. In FIG. 1, SDU_1 and SDU_2 represent SDUs from the upper layer, PDU_1~PDU_3 represent RLC PDUs, oblique-line parts in front of PDU_1~PDU_3 represent PDU headers, and MPZ represents the maximum PDU payload size. As shown in FIG. 1, the total length of SDU_1 and SDU_2 is greater than two times MPZ, but smaller than three times MPZ. Therefore, the prior art uses a segmentation method to carry SDU_1 and SDU_2 with PDU_1~PDU_3. The segmentation method is: if the length of one or concatenated SDUs is greater than one or multiple times of MPZ, the RLC entity will segment the SDU with a unit of MPZ until a last segment or SDU smaller than MPZ is left, and carry the last segment or SDU with a flexible-size RLC PDU. In other words, the lengths of PDU_1 and PDU_2 are equal to the maximum PDU size, while the length of PDU_3 is smaller than the maximum PDU size.

To support the flexible RLC PDU size feature, a segmentation function is added in the MAC layer. According to what is specified in related RLC and MAC specifications, to support flexible RLC PDU size feature, a Length (L) field in MAC-ehs PDU format is defined to indicate the RLC PDU size. The L field is 11-bit long, which is a large overhead in MAC-ehs header.

Figure 2:
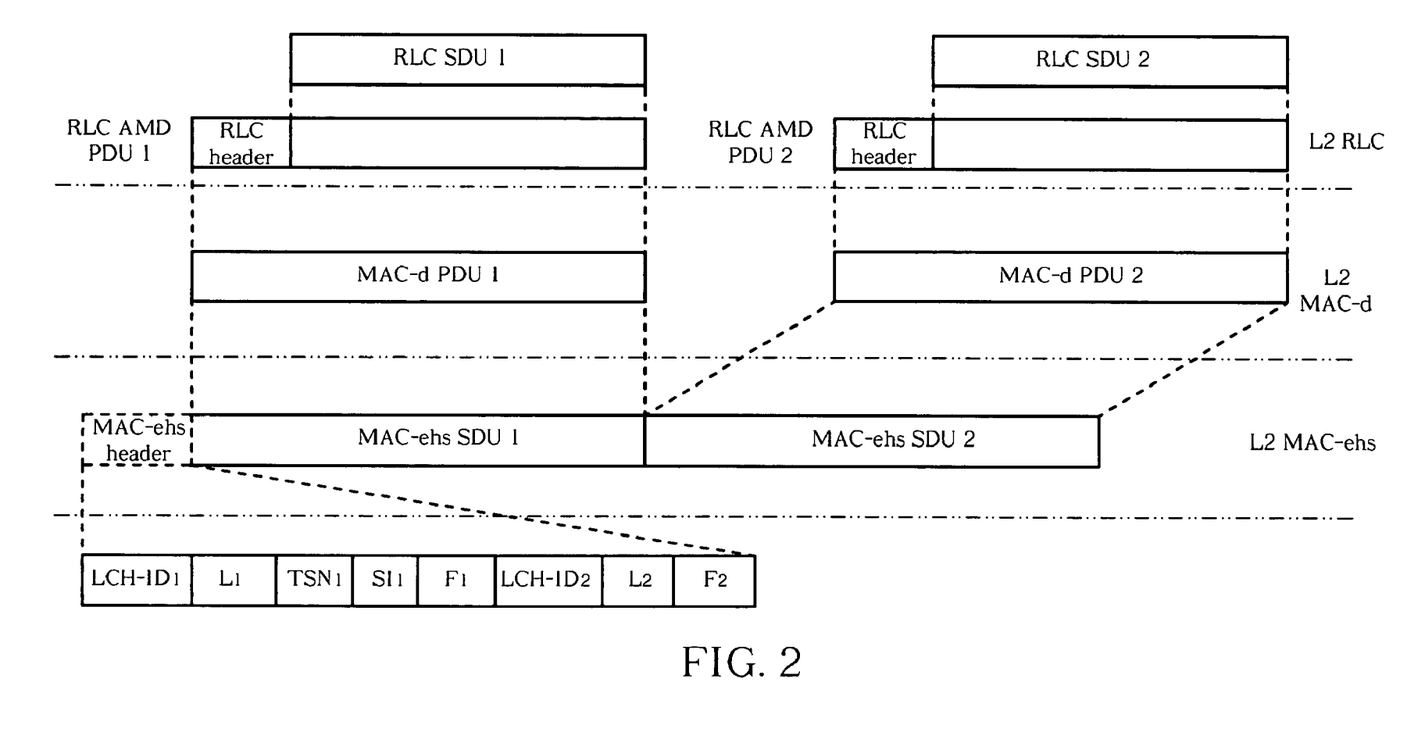
FIG. 2 illustrates a schematic diagram of transmission of two RLC AMD PDUs according to the prior art.

Please refer to FIG. 2, which illustrates a schematic diagram of transmission of two RLC AMD (Acknowledgment Mode Data) PDUs when flexible PDU size is configured according to the prior art. In FIG. 2, the RLC layer submits two RLC AMD PDUs with the same RLC PDU size into MAC-d/MAC-ehs layers via a logical channel. The MAC-ehs layer generates a MAC-ehs PDU including a MAC-ehs SDU 1 and a MAC-ehs SDU 2. Since the RLC layer submits the two RLC AMD PDUs with the same RLC PDU size via the same logical channel, LCH-ID$_2$ is equal to LCH-ID$_1$ and L$_2$ is equal to L$_1$. The total length of the MAC-ehs header is 40 bits. Note that, meanings of the parameters LCH-ID, L, TSN, SI, and F can be found in related specifications, and will not be narrated in detail for clarity.

Therefore, due to flexible RLC PDU size, the L fields are added in the MAC-ehs header to indicate lengths of corresponding RLC PDUs; thus overhead occurs.

SUMMARY OF THE INVENTION

According to the present invention, a method for enhancing transmission efficiency in a transmitter of a wireless communication system comprises forming a first RLC PDU and a second RLC PDU with a size equal to a size of the first RLC PDU in an RLC layer, submitting the first RLC PDU and the second RLC PDU to a MAC layer via a logic channel, combining the first RLC PDU with the second RLC PDU into a MAC PDU, forming a header comprising a plurality of fields indicating parameters of the first RLC PDU and a specified field indicating parameters of the second RLC PDU in the MAC PDU, and transmitting the MAC PDU to a peer receiver.

According to the present invention, a communication device of a wireless communication system utilized for enhancing transmission efficiency comprises a control circuit for realizing functions of the communication device, a processor installed in the control circuit for executing a program code to operate the control circuit, and a memory coupled to the processor for storing the program code. The program code comprises forming a first RLC PDU and a second RLC PDU with a size equal to a size of the first RLC PDU in an RLC layer, submitting the first RLC PDU and the second RLC PDU to a MAC layer via a logic channel, combining the first RLC PDU with the second RLC PDU into a MAC PDU, forming a header comprising a plurality of fields indicating parameters of the first RLC PDU and a specified field indicating parameters of the second RLC PDU in the MAC PDU, and transmitting the MAC PDU to a peer receiver.

According to the present invention, a method for enhancing transmission efficiency in a receiver of a wireless communication system comprises receiving a MAC PDU carrying a first RLC PDU and a second RLC PDU, determining that the first RLC PDU and the second RLC PDU are submitted via the same logic channel and sizes of the first RLC PDU and the second RLC PDU are the same when a plurality of fields indicating parameters of the first RLC PDU and a specified field indicating parameters of the second RLC PDU are found in a header of the MAC PDU, extracting the first RLC PDU and the second RLC PDU from the MAC PDU according to the header of the MAC PDU, and delivering the first RLC PDU and the second RLC PDU to an upper layer.

According to the present invention, a communication device of a wireless communication system utilized for enhancing transmission efficiency comprises a control circuit for realizing functions of the communication device, a processor installed in the control circuit for executing a program code to operate the control circuit, and a memory coupled to the processor for storing the program code. The program code comprises receiving a MAC PDU carrying a first RLC PDU and a second RLC PDU, determining that the first RLC PDU and the second RLC PDU are submitted via the same logic channel and sizes of the first RLC PDU and the second RLC PDU are the same when a plurality of fields indicating parameters of the first RLC PDU and a specified field indicating parameters of the second RLC PDU are found in a header of the MAC PDU, extracting the first RLC PDU and the second RLC PDU from the MAC PDU according to the header of the MAC PDU, and delivering the first RLC PDU and the second RLC PDU to an upper layer.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
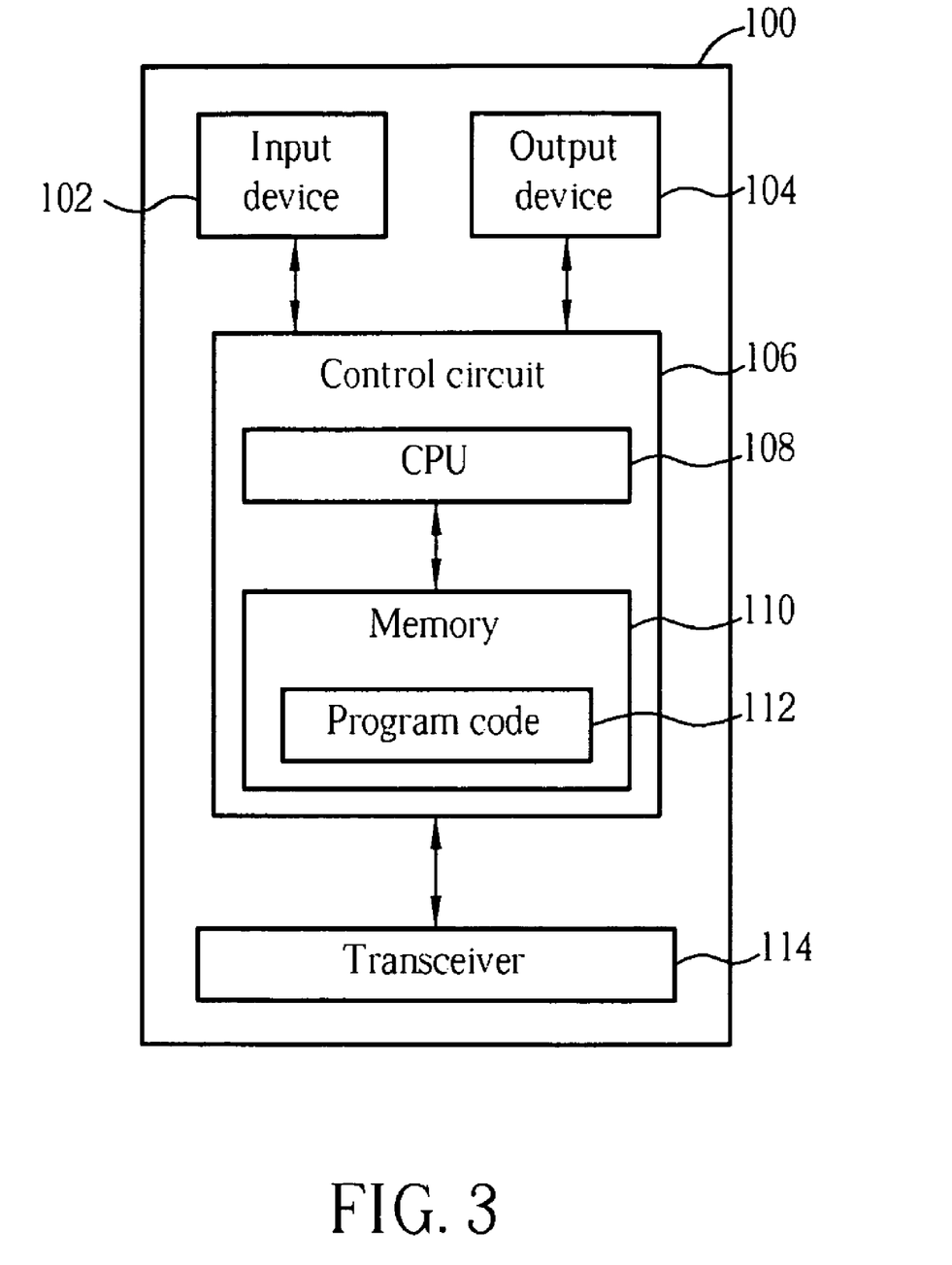
FIG. 3 illustrates a function block diagram of a wireless communication device.

Please refer to FIG. 3, which is a functional block diagram of a communication device 100. For the sake of brevity, FIG. 3 only shows an input device 102, an output device 104, a control circuit 106, a central processing unit (CPU) 108, a memory 110, a program code 112, and a transceiver 114 of the communication device 100. In the communication device 100, the control circuit 106 executes the program code 112 in the memory 110 through the CPU 108, thereby controlling an operation of the communication device 100. The communication device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communication protocol framework, the transceiver 114 can be seen as a portion of Layer 1, RF and antenna, and the control circuit 106 can be utilized to realize functions of Layer 2 and Layer 3. Preferably, the communication device 100 is utilized in a third generation (3G) mobile communication system.

Figure 4:
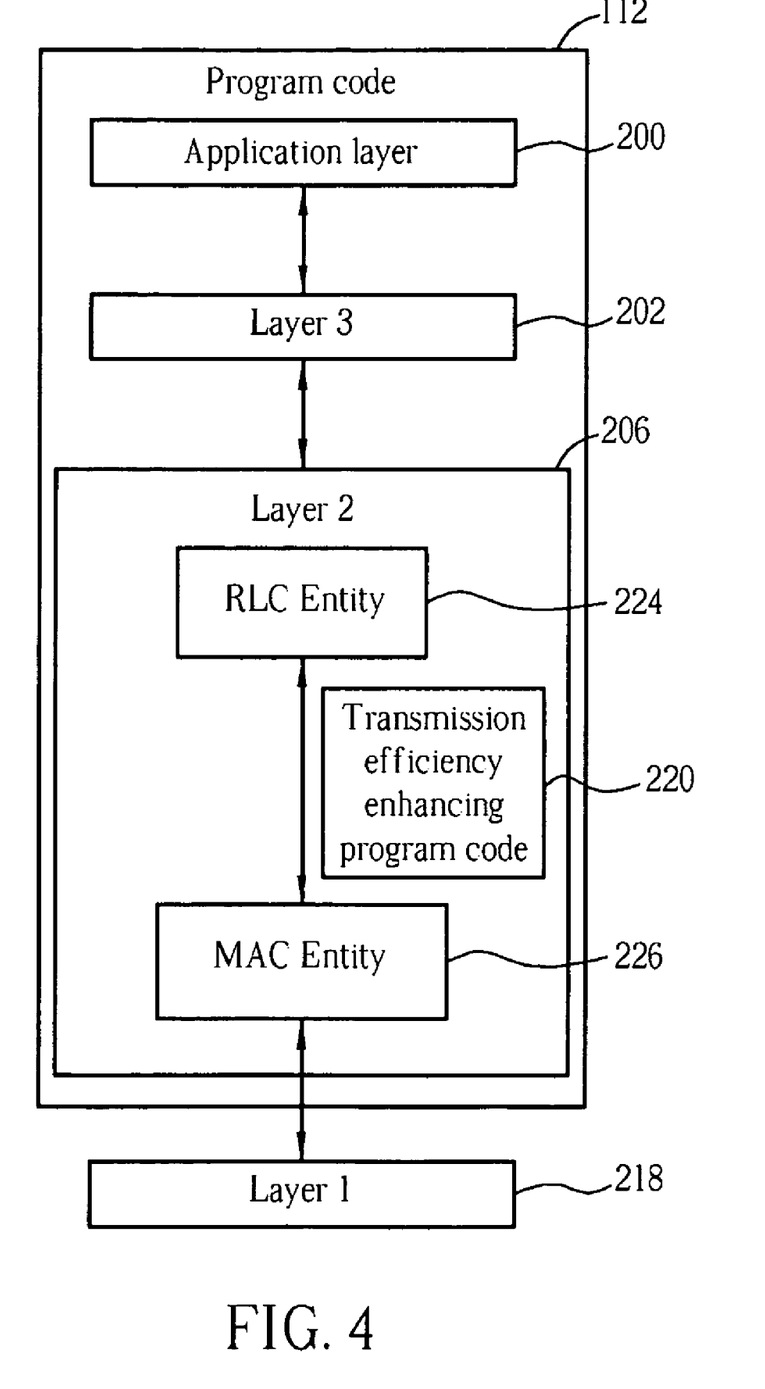
FIG. 4 illustrates a diagram of program code of FIG. 3.

Please continue to refer to FIG. 4. FIG. 4 is a diagram of the program code 112 shown in FIG. 3. The program code 112 includes an application layer 200, a Layer 3 202, and a Layer 2 206, and is coupled to a Layer 1 218. The Layer 2 206 comprises two sub-layers: a radio link control (RLC) entity 224 and a media access control (MAC) entity 226. A primary function of the RLC entity 224 is providing different transmission quality processing, performing segmentation, reassembly, concatenation, padding, retransmission, sequence check, and duplication detection on received data or control instructions based on different transmission quality requirements. The MAC entity 226 can match packets received from different logic channels of the RLC entity 224 to common, shared, or dedicated transport channels according to radio resource allocation commands of the Layer 3 (RRC layer) 202, for performing channel mapping, multiplexing, transport format selection, or random access control.

Targeting at high data rate applications, such as HSDPA and HSUPA in the 3G mobile communications system, the RLC entity 224 can use flexible-size RLC PDU to eliminate "padding", and enhance bandwidth utility rate, data processing efficiency, and UL/DL transmission rate. To support flexible RLC PDU size feature, a Length (L) field in MAC-ehs PDU format is defined to indicate the RLC PDU size. In such a situation, the present invention provides a transmission efficiency enhancing program code 220 in the Layer 2 206, for enhancing transmission efficiency.

Figure 5:
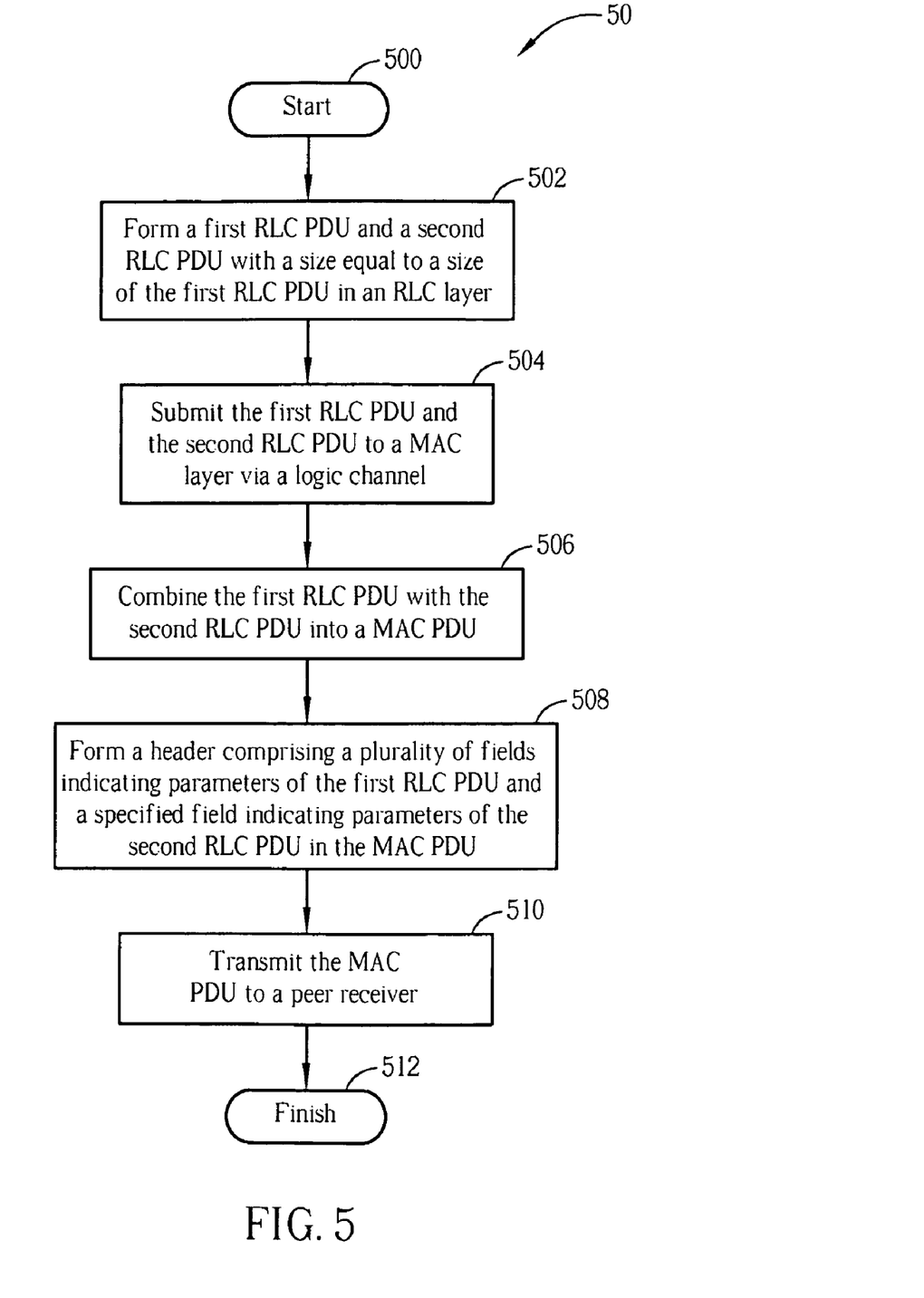
FIG. 5 and FIG. 6 illustrate flowcharts of processes according to the present invention.

Please refer to FIG. 5, which illustrates a schematic diagram of a process 50. The process 50 is utilized for enhancing transmission efficiency in a transmitter of a wireless communication system, and can be compiled in the transmission efficiency enhancing program code 220. The process 50 comprises the following steps:

Step 500: Start.

Step 502: Form a first RLC PDU and a second RLC PDU with a size equal to a size of the first RLC PDU in an RLC layer.

Step 504: Submit the first RLC PDU and the second RLC PDU to a MAC layer via a logic channel.

Step 506: Combine the first RLC PDU with the second RLC PDU into a MAC PDU.

Step 508: Form a header comprising a plurality of fields indicating parameters of the first RLC PDU and a specified field indicating parameters of the second RLC PDU in the MAC PDU.

Step 510: Transmit the MAC PDU to a peer receiver.

Step 512: Finish.

According to the process 50, in the transmitter, when the RLC layer submits the first RLC PDU and the second RLC PDU, which have the same sizes, to the MAC layer via the same logic channel, the present invention forms the corresponding MAC PDU with the header comprising fields indicating parameters of the first RLC PDU and a specified field indicating parameters of the second RLC PDU in the MAC PDU. Preferably, the first RLC PDU and the second RLC PDU are consecutive, and the specified field is the LCH-ID field, which is 4-bit long. In other words, if two consecutive RLC PDUs with the same size are submitted via the same logic channel, the MAC layer uses a special value of the LCH-ID field corresponding to the last RLC PDU of the two consecutive RLC PDUs, substituting for fields of L, TSN, or SI for example.

Figure 6:
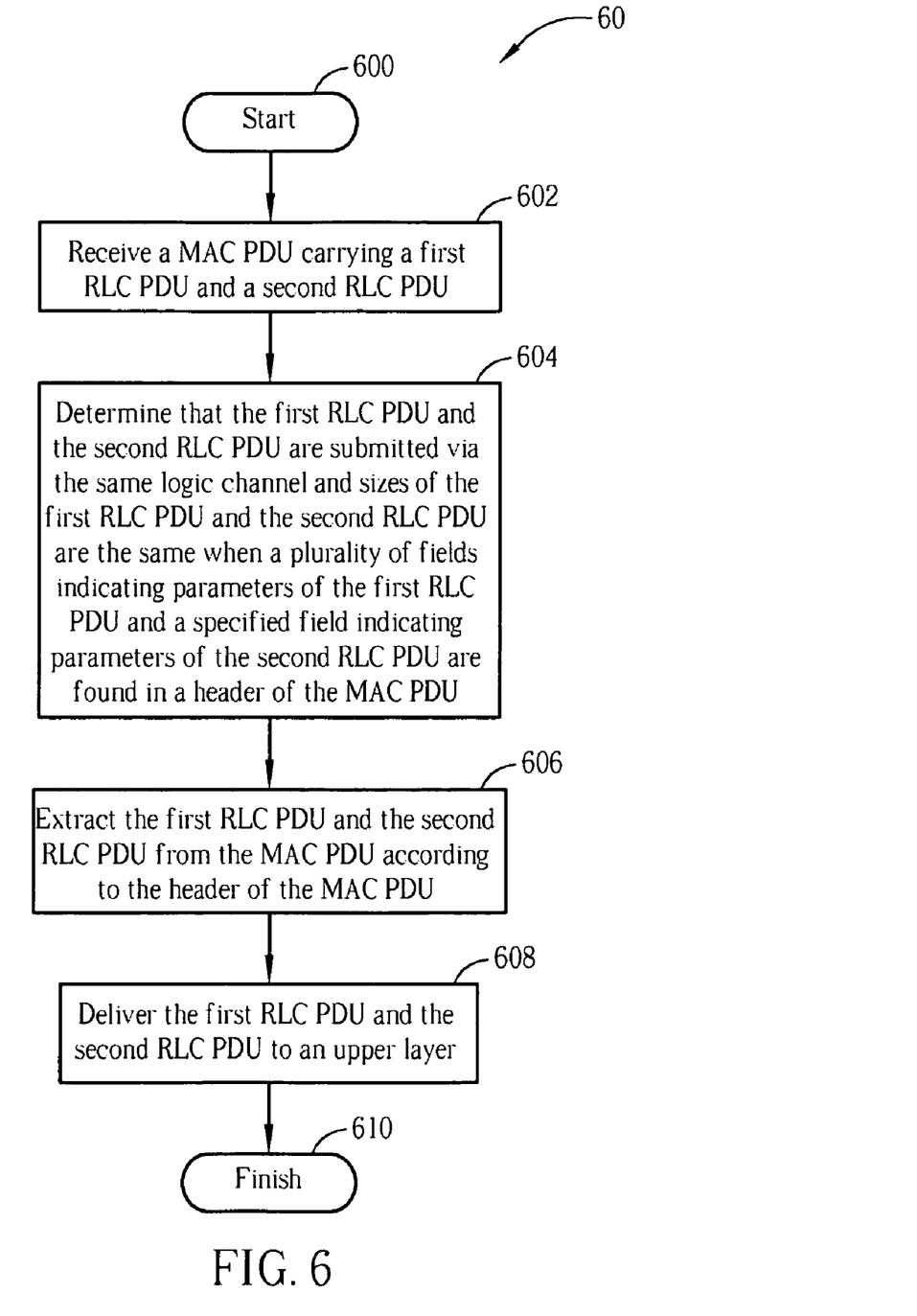

To accomplish the process 50, the present invention further provides a process 60 shown in FIG. 6 for enhancing transmission efficiency in a receiver of a wireless communication system. The process 60 can also be compiled in the transmission efficiency enhancing program code 220, and comprises the following steps:

Step 600: Start.

Step 602: Receive a MAC PDU carrying a first RLC PDU and a second RLC PDU.

Step 604: Determine that the first RLC PDU and the second RLC PDU are submitted via the same logic channel and sizes of the first RLC PDU and the second RLC PDU are the same when a plurality of fields indicating parameters of the first RLC PDU and a specified field indicating parameters of the second RLC PDU are found in a header of the MAC PDU.

Step 606: Extract the first RLC PDU and the second RLC PDU from the MAC PDU according to the header of the MAC PDU.

Step 608: Deliver the first RLC PDU and the second RLC PDU to an upper layer.

Step 610: Finish.

According to the process 60, in the receiver, when the header of the MAC PDU comprises multiple fields indicating parameters of the first RLC PDU and a single specified field indicating parameters of the second RLC PDU, the present invention determines that the lengths of the first RLC PDU and the second RLC PDU are the same, and the first RLC PDU and the second RLC PDU are submitted via the same logic channel. Preferably, the first RLC PDU and the second RLC PDU are consecutive, and the specified field is the LCH-ID field, which is 4-bit long and used to substitute for fields of L, TSN, or SI. In other words, when a MAC PDU, comprising multiple fields indicating parameters of an RLC PDU and a specified field indicating parameters of a consecutive RLC PDU, is received, the receiver can determine that the two consecutive RLC PDUs have the same size, and are submitted via the same logic channel, so as to extract the RLC PDUS for the upper layer.

Via the processes 50 and 60, the present invention can reduce overhead in the header of the MAC PDU, so as to enhance transmission efficiency. Note that, the processes 50 and 60 are embodiment of the present invention, and those skilled in the art can make modifications accordingly.

Figure 7:
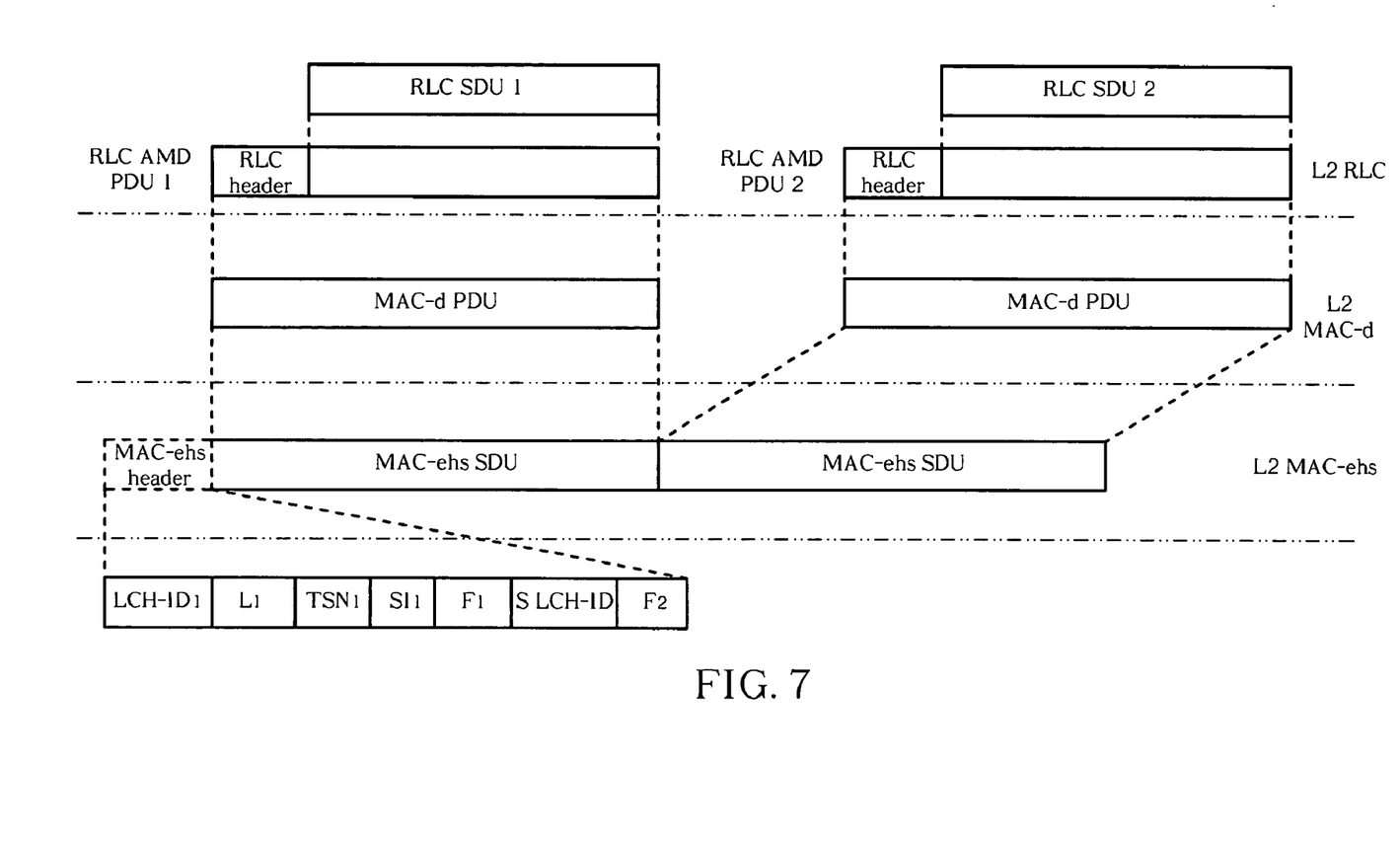
FIG. 7 illustrates a schematic diagram of transmission of two RLC AMD PDUs according to the present invention.

For example, please refer to FIG. 7, which illustrates a schematic diagram of transmission of two RLC AMD PDUs when flexible PDU size is configured according to the present invention. Since the length of the LCH-ID field is 4 bits, there are 16 values represented by the LCH-ID field. Therefore, the present invention can define a special LCH-ID by choosing one value from these 16 LCH-ID values. In such situation, if the $LCH\text{-}ID_i$ is mapped to the same reordering queue as $LCH\text{-}ID_{i-1}$ and the reordering $PDU_i$ size is the same as the reordering $PDU_{i-1}$ size, $LCH\text{-}ID_i$ is set to the special LCH-ID and there is no $L_i$, $TSN_i$, or $SI_i$ fields, while the $L_1$, $TSN_1$, and $SI_1$ fields are always present. Therefore, in FIG. 7, the special LCH-ID (i.e. S LCH-ID) is used, so the $L_2$, $TSN_2$, and $SI_2$ fields are removed, to reduce overhead of the MAC-ehs header. As a result, the total length of MAC-ehs header would be 29 (40-11) bits. 11 bits can be reserved for data and the header overhead is decreased.

In summary, the present invention can reduce length of MAC-ehs header, so as to enhance transmission efficiency.

Those skilled in the art will readily observe that numerous modifications and alterations of the device and method may be made while retaining the teachings of the invention.

What is claimed is:

1. A method for enhancing transmission efficiency in a transmitter of a wireless communication system comprising:
   forming a first Radio Link Control Protocol Data Unit (RLC PDU) and a second RLC PDU with a size equal to a size of the first RLC PDU in an RLC layer;
   submitting the first RLC PDU and the second RLC PDU to a Medium Access Control (MAC) layer via a logic channel;
   combining the first RLC PDU with the second RLC PDU into a MAC PDU;
   forming a header comprising a plurality of fields indicating parameters of the first RLC PDU and a specified field indicating parameters of the second RLC PDU identical with the parameters of the first RLC PDU in the MAC PDU; and
   transmitting the MAC PDU to a peer receiver.

2. The method of claim 1, wherein the specified field indicating parameters of the second RLC PDU is 4-bit long.

3. The method of claim 1, wherein the first RLC PDU and the second RLC PDU are consecutive.

4. A communication device of a wireless communication system utilized for enhancing transmission efficiency comprising:
   a control circuit for realizing functions of the communication device;
   a processor installed in the control circuit for executing a program code to operate the control circuit; and
   a memory coupled to the processor for storing the program code;
   wherein the program code comprises:
      forming a first Radio Link Control Protocol Data Unit (RLC PDU) and a second RLC PDU with a size equal to a size of the first RLC PDU in an RLC layer;
      submitting the first RLC PDU and the second RLC PDU to a Medium Access Control (MAC) layer via a logic channel;
      combining the first RLC PDU with the second RLC PDU into a MAC PDU;
      forming a header comprising a plurality of fields indicating parameters of the first RLC PDU and a specified field indicating parameters of the second RLC PDU identical with the parameters of the first RLC PDU in the MAC PDU; and
      transmitting the MAC PDU to a peer receiver.

5. The communication device of claim 4, wherein the specified field indicating parameters of the second RLC PDU is 4-bit long.

6. The communication device of claim 4, wherein the first RLC PDU and the second RLC PDU are consecutive.

7. A method for enhancing transmission efficiency in a receiver of a wireless communication system comprising:
   receiving a Medium Access Control Protocol Data Unit (MAC PDU) carrying a first Radio Link Control (RLC) PDU and a second RLC PDU;
   determining that the first RLC PDU and the second RLC PDU are submitted via the same logic channel and sizes of the first RLC PDU and the second RLC PDU are the same when a plurality of fields indicating parameters of the first RLC PDU and a specified field indicating parameters of the second RLC PDU identical with the parameters of the first RLC PDU are found in a header of the MAC PDU;

extracting the first RLC PDU and the second RLC PDU from the MAC PDU according to the header of the MAC PDU; and delivering the first RLC PDU and the second RLC PDU to an upper layer.

8. The method of claim 7, wherein the specified field indicating parameters of the second RLC PDU is 4-bit long.

9. The method of claim 7, wherein the first RLC PDU and the second RLC PDU are consecutive.

10. A communication device of a wireless communication system utilized for enhancing transmission efficiency comprising:

a control circuit for realizing functions of the communication device;

a processor installed in the control circuit for executing a program code to operate the control circuit; and a memory coupled to the processor for storing the program code;

wherein the program code comprises:

receiving a Medium Access Control Protocol Data Unit (MAC PDU) carrying a first Radio Link Control (RLC) PDU and a second RLC PDU;

determining that the first RLC PDU and the second RLC PDU are submitted via the same logic channel and sizes of the first RLC PDU and the second RLC PDU are the same when a plurality of fields indicating parameters of the first RLC PDU and a specified field indicating parameters of the second RLC PDU identical with the parameters of the first RLC PDU are found in a header of the MAC PDU;

extracting the first RLC PDU and the second RLC PDU from the MAC PDU according to the header of the MAC PDU; and delivering the first RLC PDU and the second RLC PDU to an upper layer.

11. The communication device of claim 10, wherein the specified field indicating parameters of the second RLC PDU is 4-bit long.

12. The communication device of claim 10, wherein the first RLC PDU and the second RLC PDU are consecutive.

* * * * *